J. C. HENDRY.
Hub-Attaching Device.

No. 203,911.    Patented May 21, 1878.

Witnesses:                    Inventor,
N. C. McArthur,          John C. Hendry,
C. L. Evert              per
                         T. H. Alexander & Elliott,
                              Attorneys.

UNITED STATES PATENT OFFICE.

JOHN C. HENDRY, OF BOSTON, MASSACHUSETTS.

IMPROVEMENT IN HUB-ATTACHING DEVICES.

Specification forming part of Letters Patent No. 203,911, dated May 21, 1878; application filed October 11, 1877.

*To all whom it may concern:*

Be it known that I, JOHN C. HENDRY, of Boston, in the county of Suffolk and State of Massachusetts, have invented certain new and useful Improvements in Vehicle-Hubs; and I do hereby declare that the following is a full, clear, and exact description thereof, reference being had to the accompanying drawings, and to the letters of reference marked thereon, which form part of this specification.

My present invention relates to vehicle-hubs; and it consists in certain improvements upon Letters Patent No. 178,772, granted to me June 13, 1876, as will be hereinafter more fully set forth.

In order to enable others skilled in the art to which my invention appertains to make and use the same, I will now proceed to describe its construction and operation, referring to the annexed drawings, in which—

Figure 1:
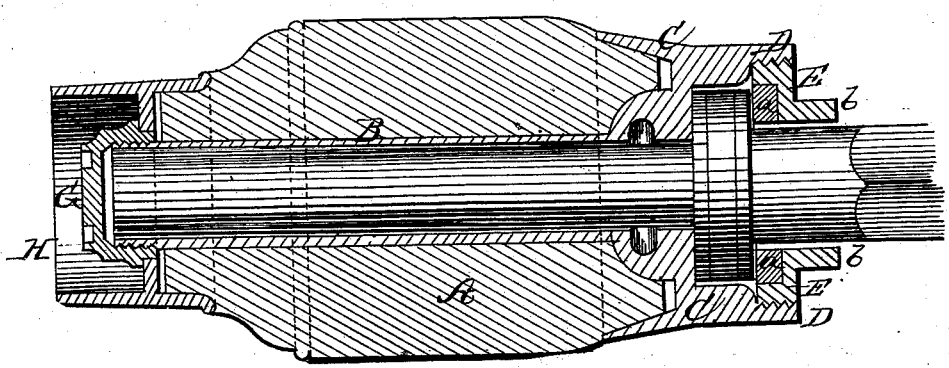
Figure 2:
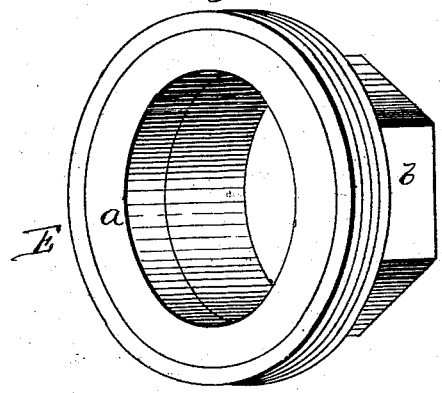

Figure 1 is a longitudinal section of my vehicle-hub embodying my present invention, and Fig. 2 is a detached view of a part thereof.

A represents the ordinary wooden hub, with axle-box B, said box being, at its inner end, formed with the cap C, and on said end with a projecting annular flange, D. On the outer end of the hub is the metallic band H, and G is the nut screwed upon the outer end of the box B.

The above parts are all constructed substantially in the same manner as described in my former patent above referred to, with the exception that in said patent the flange D on the inner end of the hub was provided with exterior screw-threads, while in the present case said flange is left smooth on the outside and provided with interior screw-threads, as shown.

The usual collar upon the axle lies within the flange D, and the axle held in place in the hub by means of a nut, E. In the present case this nut is provided with exterior screw-threads to fit and screw into the flange D. The nut E is recessed on its inner side and provided with packing *a*, of soft metal or other suitable material. This nut has also on its outside a projecting flange, *b*, on which a wrench may be placed for unscrewing the nut from the flange D.

Having thus fully described my invention, I claim as new and desire to secure by Letters Patent—

As an improvement upon Letters Patent No. 178,772, the combination of the axle-box B, formed with the cap C, having a projecting annular flange, D, with interior screw-threads, and the hollow screw plug or nut E, recessed on its inner side to receive the annular packing *a*, and provided with exterior screw-threads and a projecting polygonal-shaped flange,*b*, all substantially as and for the purposes herein set forth.

In testimony that I claim the foregoing as my own I affix my signature in presence of two witnesses.

JOHN C. HENDRY.

Witnesses:
   CHAS. H. GARLAND,
   GEORGE E. BATES.